UNITED STATES PATENT OFFICE.

JOHN H. DAVIS, OF FINDLAY, OHIO, ASSIGNOR OF ONE-THIRD TO YEATMAN BICKHAM, OF SAME PLACE.

CARBON FOR ELECTRICAL PURPOSES AND THE PROCESS OF MAKING IT.

SPECIFICATION forming part of Letters Patent No. 430,991, dated June 24, 1890.

Application filed February 14, 1890. Serial No. 340,458. (No model.)

*To all whom it may concern:*

Be it known that I, JOHN H. DAVIS, a citizen of the United States, residing at Findlay, in the county of Hancock and State of Ohio, have invented certain new and useful Improvements in Carbons and the Process for Making Them; and I do hereby declare the following to be a full, clear, and exact description of the invention, such as will enable others skilled in the art to which it appertains to make and use the same.

My present invention consists in a process for making carbons for use in connection with electrical batteries or any other electrical apparatus or the various uses to which carbon may be applied and in the product thus obtained. The details of this process, as well as the peculiarities of the product, I will now proceed to describe.

In the first place I use the carbonaceous oily mineral material called in general terms "oil-shale," which is found as a vein in the coal-fields of Pennsylvania, Ohio, Indiana, and elsewhere. The peculiarities of this material are that in its original condition it has but slight conductive power and in its powdered condition less. In carrying out the present process this oil-shale is preferably first baked or calcined. This eliminates the volatile and impure matter. After the shale has been thus treated it is ground or in any other suitable way reduced to a powder or like finely-comminuted state. This product is then thoroughly intermixed with pitch, asphaltum, or like cohesive substance, by means of which it is firmly united and bound together. In carrying out this part of my invention I take of the powdered shale eighty parts and of the cohesive substance twenty parts; but I do not propose to limit myself exactly to these proportions, for I may in some degree vary them without essentially changing the result. In the mere detail of mixing I use any desirable or ordinary appliances. Finally this mixture is molded into any shapes or forms that may be required for the uses above set forth.

Heretofore it has been considered that the conductivity of oil-shale in its original state was too slight to admit of its being used for making carbons; but the product obtained by this process above described possesses a very close grain or that solidity particularly desired to secure the best conductivity, so that the product possesses in very peculiar degree the essential requisite for this use, not only in structure, whereby it is easily handled and adapted to its position, but in its conductive qualities and all the properties required in a device of this kind.

Of course it will be understood that in the mere detail of carrying out the above process many changes may be made that under varying circumstances may be desired—as, for instance, it is not absolutely necessary that the grinding shall be done after the calcining or like treatment. As a matter of fact, this can be done before or after, though the preferable way will be to grind after calcination or the after treatment, and, while I have used terms "baking" or "calcining," I intend to include cooking or such like or similar treatment as shall eliminate the volatile and impure matter in a thorough or satisfactory way from the shale.

What I claim as my invention is—

1. The herein-described process of making carbons for electrical purposes, which consists in baking or calcining oil-shale, reducing the same to powder or a finely-comminuted state, and mixing this product with pitch, asphaltum, or like cohesive substance in the proportion of eighty parts shale and twenty parts cohesive substance, and finally in molding the same into carbons.

2. The within-described carbon, composed of calcined and ground shale and adhesive substance, substantially in the manner and for the purposes as shown and described.

In testimony whereof I affix my signature in presence of two witnesses.

JOHN H. DAVIS.

Witnesses:
 Y. BICKHAM,
 R. F. POLLOCK.